United States Patent [19]

Barth

[11] Patent Number: 4,804,554
[45] Date of Patent: Feb. 14, 1989

[54] PROCESS FOR THE PRODUCTION OF FERMENTED DRINKS WITH REDUCED ALCOHOL CONTENT

[76] Inventor: Norbert Barth, Bergweg 20, 6228 Eltville 3, Fed. Rep. of Germany

[21] Appl. No.: 947,634

[22] Filed: Dec. 30, 1986

[30] Foreign Application Priority Data

Nov. 9, 1986 [DE] Fed. Rep. of Germany ....... 3600352

[51] Int. Cl.⁴ .......................... C12H 1/04; C12F 3/04
[52] U.S. Cl. .................................... 426/592; 210/651; 426/386; 426/493
[58] Field of Search ................... 203/19, 49, DIG. 13; 426/271, 592, 386, 425, 478, 492, 493, 7, 14; 210/645, 643, 648, 634, 644, 651

[56] References Cited

U.S. PATENT DOCUMENTS

| | | | |
|---|---|---|---|
| 4,405,652 | 9/1983 | Boucher | 426/493 |
| 4,499,117 | 2/1985 | Bonneau | 426/493 |
| 4,532,140 | 7/1985 | Bonnome | 426/592 |
| 4,581,236 | 4/1986 | Bandel et al. | 426/592 |
| 4,610,887 | 9/1986 | Galzy et al. | 426/490 |
| 4,612,196 | 9/1986 | Goldstein et al. | 426/490 |
| 4,617,127 | 10/1986 | Light | 210/654 |
| 4,626,437 | 12/1986 | Schobinger et al. | 426/14 |
| 4,664,918 | 5/1987 | Tilgner et al. | 426/14 |
| 4,681,767 | 7/1987 | Weiss | 426/386 |

Primary Examiner—Donald E. Czaja
Assistant Examiner—Carolyn Paden
Attorney, Agent, or Firm—Gifford, Groh, Sheridan, Sprinkle and Dolgorukov

[57] ABSTRACT

In a process for the production of a fermented drink with a reduced alcohol content, alcohol is removed from the drink by dialysis and then removed from the dialysis liquid by vacuum distillation. The fermented drink in the original condition is used as the dialysis liquid and flavor and aroma-giving substances which are desired in the finished drink and which occur in the vacuum distillation operation are returned to the dialysis liquid prior to re-use thereof.

9 Claims, 1 Drawing Sheet

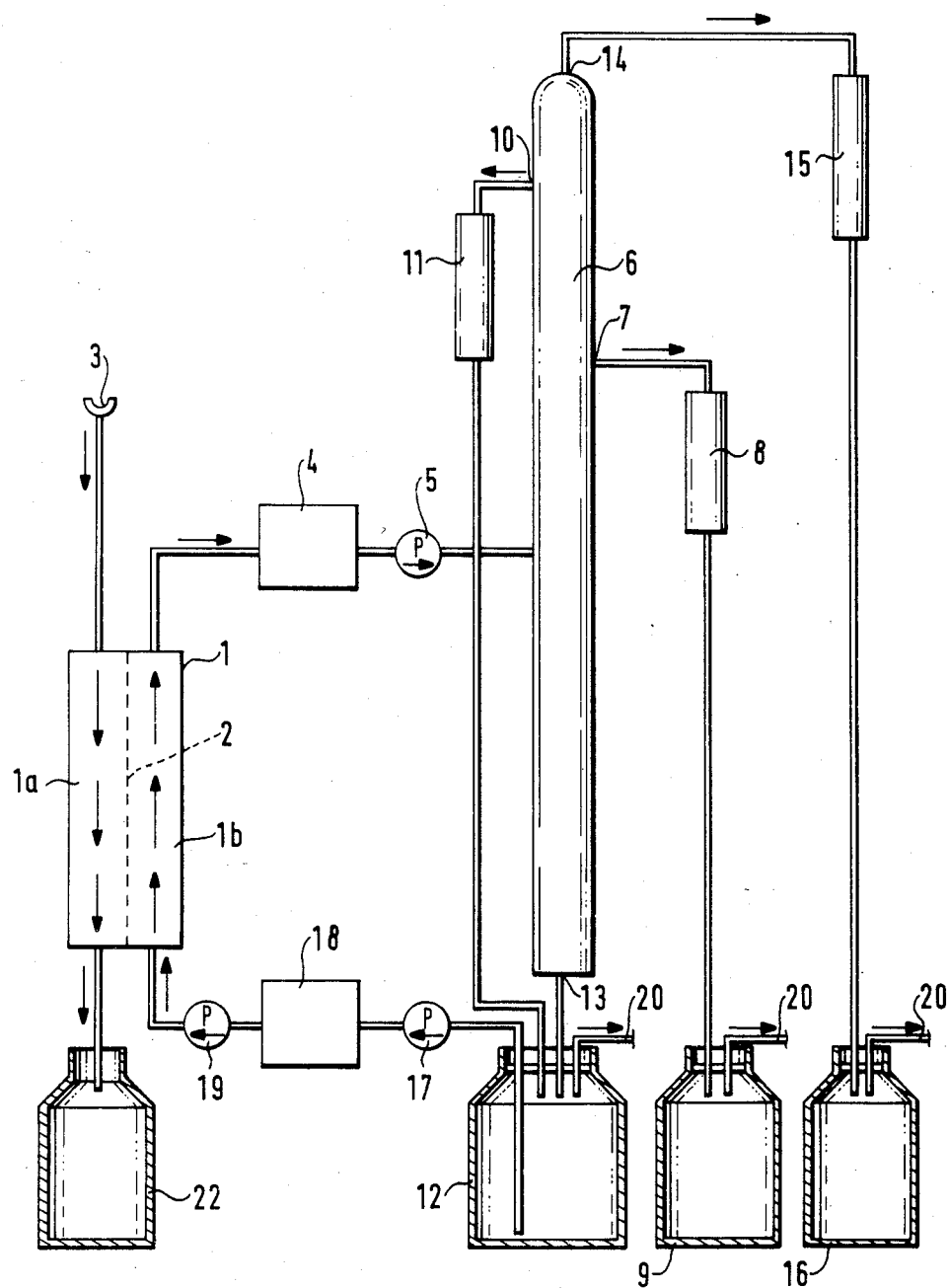

PROCESS FOR THE PRODUCTION OF FERMENTED DRINKS WITH REDUCED ALCOHOL CONTENT

BACKGROUND OF THE INVENTION

There are a number of processes for reducing the alcohol content in fermented drinks such as wine, beer and champagne. In one such process, as disclosed in European published specification No. 0 058 634, the fermented drink is subjected to a fractional distillation operation in order to remove therefrom the alcohol (ethanol). In order not to subject the drink to an excessively high level of temperature loading, in order to avoid the taste thereof being affected, the distillation operation may be carried out under vacuum. That process also provides that the taste and aroma substances which are removed in the fractional distillation operation, besides the ethanol, are added back to the drink to put it into its finished form. In spite of using fractional vacuum distillation and evaporators which permit evaporation to be as quick and as careful as possible, for example thin-film evaporators, that process provides that the finished product suffers from the disadvantage that the taste thereof is adversely affected and there are serious deviations from the true taste of the original drink.

In another process, the ethanol in a fermented drink may also be extracted by means of organic solvents. Apart from the fact that the use of such a process is in conflict with the provisions of foodstuffs laws, that process also results in the taste of the drink being adversely affected.

In a number of other forms of a process for reducing the alcohol content in a fermented drink, the alcohol content may be reduced by carrying out a dialysis operation in which the fermented drink, for example wine, flows on one side of a dialysis membrane while a dialysing liquid, for example water, flows on the other side of the membrane, preferably in counter-flow relationship to the fermented drink. The differential pressure between the two liquids is very slight or even zero. The critical consideration in regard to the interchange of substances in the dialysis operation is diffusion through the membrane, which depends on the ratio between the levels of concentration of the respective substances on the two sides of the membrane. In that respect attention may be directed to European patent specification No. 0 021 247 and also German laid-open application DE-OS) No. 30 09 829. In one form of such a process, the dialysis liquid used may be an alcohol-free drink, for example a fruit juice, or a drink corresponding to the drink to be dialysed, and the dialysed alcohol may be removed by vacuum distillation.

However, those processes are such that the taste of the finished product is still adversely affected by the steps involved in the process.

SUMMARY OF THE INVENTION

An object of the present invention is to provide a process for reducing the alcohol content in a fermented drink, in which the resulting product is not seriously adversely affected in regard to the taste thereof.

Another object of the present invention is to provide a process for producing a fermented drink with reduced alcohol content, which still retains at least substantially the full taste of the drink, in spite of the reduction in alcohol content.

Still another object of the invention is to provide a process for the production of wine with a reduced alcohol content, which can be carried into effect in an efficient manner.

In accordance with the principles of the present invention, those and other objects are achieved by a process for producing a fermented drink such as wine which has a reduced alcohol content, using a dialysis operation, wherein a dialysis liquid on the one hand and fermented drink in the original condition on the other hand are passed along separate sides of a dialysis membrane. Alcohol is removed from the dialysis liquid by vacuum distillation, and it is then used again as the dialysis liquid. The dialysis liquid used is the fermented drink in its original condition and the taste and aroma-giving substances which are desired in the finished product or final drink and which are removed in a fractional vacuum distillation operation are added back to the dialysing liquid.

As the fermented drink itself, more particularly in the original condition thereof, is used as the dialysing liquid, there is no drop in concentration in respect of the desired taste and aroma-giving substances on the respective sides of the dialysis membrane so that the drink retains its original flavour. Insofar as aroma-giving substances which are desired to be present in the finished drink are removed from the drink in the fractional vacuum distillation operation, in addition to the ethanol content, the fact that those substances are returned to the dialysing fluid also means that there is no drop in the level of concentration, thereby avoiding an adverse effect in regard to the finished product.

In a further feature of the invention, in the fractional vacuum distillation operation, in addition to the ethanol, it is also possible to remove other undesirable constituents, for example acetaldehyde and sulphurous acid so that it is even possible to achieve an improvement in comparison with the original drink. Desirably, in the finished product, the loss in volume due to the removal of alcohol and the removal of the undesirable constituents is not compensated, for example by the addition of water, in order to at least partially to compensate for the change in taste due to the removal of alcohol, by concentrating the flavour and aromagiving substances.

The dialysate which is continuously re-used after removal of the alcohol (ethyl alcohol = ethanol) and possibly the undesirable constituents as well as the addition of the desired flavour and aroma-giving substances, and which is thus re-cycled, also suffers from losses in volume which are then desirably compensated by addition of the fermented drink in its original condition. That addition operation is advantageously effected prior to the distillation step in order to include the alcohol content of the fermented drink in the distillation operation.

In accordance with another feature of the invention, the dialysis membrane used is a hydrophilic membrane, that is to say a membrane which is water-wettable.

In another aspect of the invention, the process according to the invention may be used for the production of drinks with a reduced calorie content, by fermenting a sugar-bearing drink and then subjecting it to the process according to the invention. The invention thus provides a process for the production of calorie and alcohol-reduced drink comprising fermenting a sugar-bearing drink and then subjecting the fermented drink to a dialysis operation in which a dialysis liquid on the one hand and the fermented drink in the original condition on the other hand are passed along separate sides of a dialysis membrane, and alcohol is removed from the dialysis liquid by vacuum distillation and then same is used again as the dialysis liquid. The dialysis liquid used is the fermented drink in the original condition and flavour and aroma-giving substances which are removed in the fractional vacuum distillation operation are added back to the dialysis liquid.

The fermentation operation converts the original sugar content of the drink into alcohol so that removal of the alcohol then gives a drink with a greatly reduced calorie content.

Further objects, features and advantages of the present invention will be apparent from the following description thereof.

BRIEF DESCRIPTION OF THE DRAWING

The drawing is a diagrammatic view of an apparatus for carrying out the process of the invention.

DESCRIPTION OF THE PREFERRED EMBODIMENT

A dialysis module or unit 1 is subdivided into first and second chambers 1a and 1b by a semipermeable dialysis membrane 2. A fermented drink from which the alcohol is to be at least partially removed and which is introduced into the system at the location indicated at 3 flows through the chamber 1a which is shown on the left-hand side of the membrane 2 in the drawing. A dialysing liquid is passed through the right-hand chamber 1b on the other side of the membrane 2, preferably in counter-flow relationship to the fermented drink flowing through the chamber 1a, as shown in the drawing. At the beginning of the process, the dialysing liquid comprises the same fermented drink.

After issuing from the chamber 1b, the dialysing liquid firstly passes into a buffer container 4 and is then fed by means of a pump 5 to a distillation column 6 of commercially available design. The distillation column 6 includes a plurality of plates so that the ethanol content of the drink is at least partly removed therefrom at 7, and can be fed to a collecting vessel 9 after liquefaction in a cooler 8.

Flavour and aroma-giving substances which are desired in the finished product or final drink with its reduced alcohol content may be removed at one or more further plates (not shown) in the column, at the location indicated at 10, and are then passed through a cooler 11 and into a storage container 12. The storage container 12 receives the dialysis liquid which issues from the column 6 at 13, in the form of the fermented drink from which at least part of the alcohol content has been removed. Finally, constituents of the fermented drink which are not desired in the finished product are discharged at the upper end of the column as indicated at 14. Such constituents pass by way of a further cooler 15 into a container 16.

The dialysing liquid is fed back to the right-hand changer 1b in the dialysing module 1 and thus recirculates from the container 12 by way of a pump 17, a buffer container 18 and a further pump 19.

As the distillation operation is to be a fractional vacuum distillation operation, the vessels 9, 12 and 16 are closed and each have a vacuum connection as indicated diagrammatically at 20. Additional vacuum connections may also be provided on the distillation column 6, in the usual fashion. Because the distillation operation is carried out under vacuum, the arrangement must also include the buffer containers 4 and 18 so that the dialysis module 1 can be operated under normal atmospheric pressure.

The dialysis module 1 is desirably in the form of a per se known design in which a plurality of chambers which are formed by coated or sandwiched plates are connected in parallel relationship in regard to flow therethrough, in order to increase the membrane surface area.

The membrane used is for example in the form of a commercially available hydrophilic, that is to say water-wettable, membrane which comprises for example native cellulose, polyamides or polysulphonates. The flow rate of the fermented drink which is introduced at 3 and which after passing through the chamber 1a and after removal of the alcohol content is fed to a receiving container 22 as the finished product, like the flow rate of the dialysing liquid in the chamber 1b, is to be so adjusted as to give the maximum level of yield, with removal of as much of the alcohol content from the drink as possible.

The substances which are removed from the distillation column 6 at 10 and which are desired in the finished product, in regard to the taste thereof, include for example propanol I, higher aldehydes, acetates and esters. Those substances which are removed at 14 and which are not desired in the finished product and which are therefore removed after being collected in the vessel 16, besides sulphurous acid ($SO_2$), include acetaldehydes, ethyl formiate, ethyl acetate and similar substances. The alcohol produced, contained in the vessel 9, can either be disposed of as a product or can be utilised for the production of energy for operation of the installation.

It will be appreciated that the above-described process and apparatus have been set forth solely by way of example of the present invention and that various modifications and alterations may be made therein without thereby departing from the spirit and scope of the invention.

I claim:

1. A process for the production of a drink from a mother liquor containing alcohol and flavor and aroma substances having a lower boiling point or greater vapor pressure than said alcohol, and said drink having an alcohol content less than that of said mother liquor; comprising the steps of:

dividing said mother liquor into a separated portion and a remainder;

preparing an intended dialysate from said separated portion of said mother liquor, by (a) removing said flavor and aroma substances and removing said alcohol from said separated portion by fractional vacuum distillation, yielding a residual liquid; and (b) thereafter adding back said removed flavor and aroma substances to said residual liquid, to yield said intended dialysate; and employing said dialysate to remove said alcohol from said remainder of said mother liquor by passing said intended dialysate and said remainder of said mother liquor along opposite sides of an alcohol-permeable dialysis membrane, whereby said alcohol is extracted from said remainder of said mother liquor without extracting said flavor and aroma substances from said remainder of said mother liquor, thereby yielding said drink.

2. The invention according to claim 1, wherein said mother liquor contains at least one additional contaminating constituent, wherein said at least one additional constituent is extracted from said mother liquor by said dialysate, and wherein said removing step (a) additionally comprises removing said additional constituent from said separated portion of said mother liquor by fractional vacuum distillation.

fermenting a sugar-containing drink, said fermented drink including alcohol and flavoring and bouquet substances having a lower boiling point or greater vapor pressure than said alcohol;

dividing said fermented sugar-containing drink into a separated portion and a remainder;

preparing an intended dialysate from said separated portion of said fermented sugar-containing drink by (a) removing said flavoring and bouquet substances and removing said alcohol from said separated portion by fractional vacuum distillation, yielding a residual liquid, and (b) thereafter adding back said removed flavoring and bouquet substances to said residual liquid, to yield said intended dialysate; and employing said intended dialysate to remove said alcohol from said remainder of said fermented drink by passing said intended dialysate and said remainder of said fermented sugar-containing drink along opposite sides of an alcohol-permeable dialysis membrane, whereby said alcohol is extracted from said remainder of said fermented drink without extracting said flavoring and bouquet substances from said remainder of said fermented drink, thereby yielding said calorie- and alcohol-reduced drink.

3. The invention according to claim 2, wherein said additional constituent is sulfate.

4. The invention according to claim 1, wherein said process is carried out as a continuous process.

5. The invention according to claim 4, wherein additional amounts of said mother liquor are added to said intended dialysate in a volume sufficient to compensate for any loss of volume occasioned by performance of said removing step (a).

6. The invention according to claim 5, wherein said additional amount of said mother liquor are added upstream of said removing step (a).

7. The invention according to claim 1, wherein said membrane is a hydrophilic membrane.

8. The invention according to claim 1, wherein said passing step is carried out by disposing said intended dialysate and said remainder of said mother liquor in a counterflow relationship.

9. A process for producing a calorie- and alcohol-reduced drink, comprising:

fermenting a sugar-containing drink, said fermented drink including alcohol and flavoring and bouquet substances having a lower boiling point or greater vapor pressure than said alcohol;

dividing said fermented sugar-containing drink into a separated portion and a remainder;

preparing an intended dialysate from said separated portion of said fermented sugar-containing drink by (a) removing said flavoring and bouquet substances and removing said alcohol from said separated portion by fractional vacuum distillation, yielding a residual liquid, and (b) thereafter adding back said removed flavoring and bouquet substances to said residual liquid, to yield said intended dialysate; and employing said intended dialysate to remove said alcohol from said remainder of said fermented drink by passing said intended dialysate and said remainder of said fermented sugar-containing drink along opposite sides of an alcohol-permeable dialysis membrane, whereby said alcohol is extracted from said remainder of said fermented drink without extracting said flavoring and bouquet substances from said remainder of said fermented drink, thereby yielding said calorie- and alcohol-reduced drink

\* \* \* \* \*

UNITED STATES PATENT AND TRADEMARK OFFICE
CERTIFICATE OF CORRECTION

PATENT NO. : 4,804,554

DATED : February 14, 1989

INVENTOR(S) : Norbert Barth

It is certified that error appears in the above-identified patent and that said Letters Patent is hereby corrected as shown below:

Column 1, line 51, delete "DE" and insert --(DE--.

Column 3, line 61, delete "changer" and insert --chamber--.

Claim 2, column 5, delete lines 9-34, inclusive (all of printed Claim 2 after "distillation.").

Signed and Sealed this

Twenty-first Day of November, 1989

Attest:

JEFFREY M. SAMUELS

Attesting Officer     Acting Commissioner of Patents and Trademarks

UNITED STATES PATENT AND TRADEMARK OFFICE
CERTIFICATE OF CORRECTION

PATENT NO. : 4,804,554

DATED : Feb. 14, 1989

INVENTOR(S) : Norbert Barth

It is certified that error appears in the above-identified patent and that said Letters Patent is hereby corrected as shown below:

Title page:

[30] Foreign Application Priority Data, delete "Nov. 9, 1986" and insert thereinstead --Jan. 9, 1986--;

Signed and Sealed this

Twentieth Day of March, 1990

Attest:

JEFFREY M. SAMUELS

Attesting Officer

Acting Commissioner of Patents and Trademarks